United States Patent [19]
Walton et al.

[11] Patent Number: 4,813,648
[45] Date of Patent: Mar. 21, 1989

[54] SANITARY VALVE

[75] Inventors: Herbert H. Walton; Philip L. Grabenbauer, both of Marshalltown, Iowa

[73] Assignee: Fisher Controls International, Inc., Marshalltown, Iowa

[21] Appl. No.: 125,363

[22] Filed: Nov. 25, 1987

[51] Int. Cl.⁴ .................................................. F16K 5/00
[52] U.S. Cl. .................................... 251/304; 251/208; 251/326; 251/214
[58] Field of Search ............... 251/208, 209, 214, 304, 251/305, 306, 309, 312, 314, 316, 326, 327, 328; 137/240, 241

[56] References Cited

U.S. PATENT DOCUMENTS

| | | | |
|---|---|---|---|
| 3,108,778 | 10/1963 | Nader | 251/306 X |
| 3,476,358 | 11/1969 | Westerbind et al. | 251/326 X |
| 3,648,723 | 3/1972 | Nelson et al. | 251/316 X |
| 3,763,890 | 10/1973 | Wolf | 251/326 X |
| 4,339,110 | 7/1982 | Ortega | 251/309 |

FOREIGN PATENT DOCUMENTS

| | | | |
|---|---|---|---|
| 1304240 | 8/1962 | France | 251/326 |
| 2271467 | 12/1975 | France | 251/306 |
| 321394 | 3/1970 | Sweden | 251/312 |

Primary Examiner—A. Michael Chambers
Assistant Examiner—John C. Fox
Attorney, Agent, or Firm—Dale A. Kubly; Nicholas A. Camasto; Arnold H. Cole

[57] ABSTRACT

A sanitary valve includes a valve body having a straight-through cylindrical valve chamber terminating in flanges with a valve element support intersecting the valve chamber at a right angle. The valve element is cylindrically shaped with a hemispherical tip that is covered with an elastomeric material which includes a raised circular seal that extends around the circumference of the valve element and a raised U-shaped seal that extends over the tip. The circular seal always engages the supporting means in both the rotatable and sliding versions of the valve to preclude any environmental exposure of the valve chamber.

10 Claims, 4 Drawing Sheets

FIG. 7
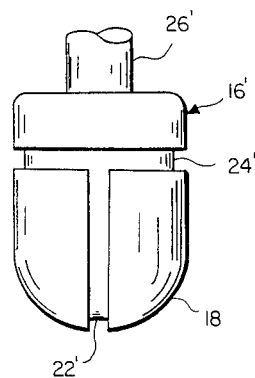
FIG. 8
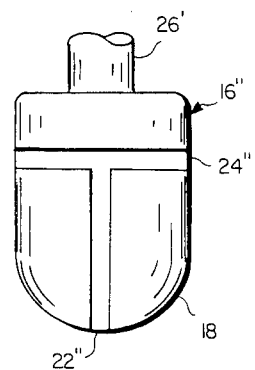
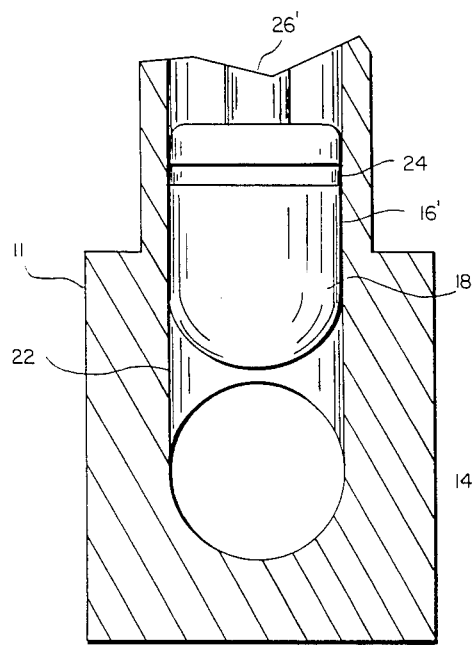
FIG. 6
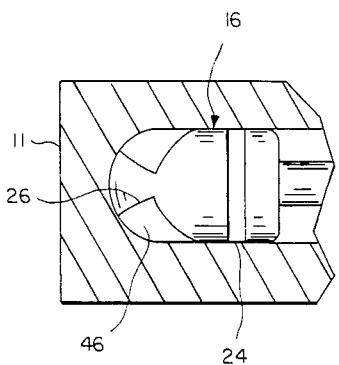
FIG. 9

SANITARY VALVE

BACKGROUND OF THE INVENTION AND PRIOR ART

This invention relates generally to sanitary valves and particularly to precision flow control valves adapted for use with fluids that are extremely sensitive to environmental exposure.

The advances of technology, especially in the area of the biological sciences such as those concerned with producing genetically altered bacteria and the like, has given rise to a need for valves that are capable of precision flow control under highly sterile conditions. In addition, the valves must be rugged, reliable, minimize the possibility of build-up of flow deposits therein and permit thorough cleaning without dismantling. Such stringent requirements gave rise to the valve constructions of the invention.

The requirements of cleanability and minimum build-up of deposits are satisfied by the straight-through cylindrical valve chamber. The valve element, which is cylindrical and has a hemispherical tip, is supported in a cylindrical supporting means that intersects the valve chamber in a right angle. This permits a continuous seal to be maintained between the valve element and its support at all times, even during cleaning. This continuous seal condition obtains both the rotary configuration and the slidable configuration of the valve of the invention. The flanges that terminate the cylindrical valve chamber permit intimate mating with a pipeline and avoid non-smooth threaded surfaces, contributing to valve flow characteristics and minimizing the build-up of deposits.

U.S. Pat. No. 2,420,849, issued May 20, 1947, describes a valve that is transversely actuated and includes a generally T-shaped resilient sealing element for closing off the walls of the valve chamber when the barrier (valve plug) is moved to its closed position. That construction is not a straight-through valve chamber design, has threaded port openings and has a split valve body in which the seal between the valve plug and the valve chamber is broken during actuation of the valve.

U.S. Pat. No. 3,536,296, issued Oct. 27, 1970, discloses a precision flow valve that includes a spherical plug element with a tapered groove extending substantially completely around the ball. The valve chamber is not a straight-through design and presents many obstructions that would pose significant problems in cleaning.

The valve construction of the invention permits the pipeline to be drained completely for in-place sterilization. It is also simple in construction, easy to operate, and lends itself to either rotary or sliding actuation.

OBJECTS OF THE INVENTION

A principal object of the invention is to provide a novel sanitary valve.

Another object of the invention is to provide a sanitary valve that is easily cleaned and safe from environmental contamination.

BRIEF DESCRIPTION OF THE DRAWINGS

These and other objects of the invention will be apparent upon reading the following description in conjunction with the drawings in which:

FIG. 6 is a similar section with the valve element in the open position;

FIGS. 7 and 8 illustrate different constructions of the valve element; and

FIG. 9 is a partial cross section illustrating a preferred installation position for the valve of FIG 1.

DESCRIPTION OF THE PREFERRED EMBODIMENT

Figure 1:
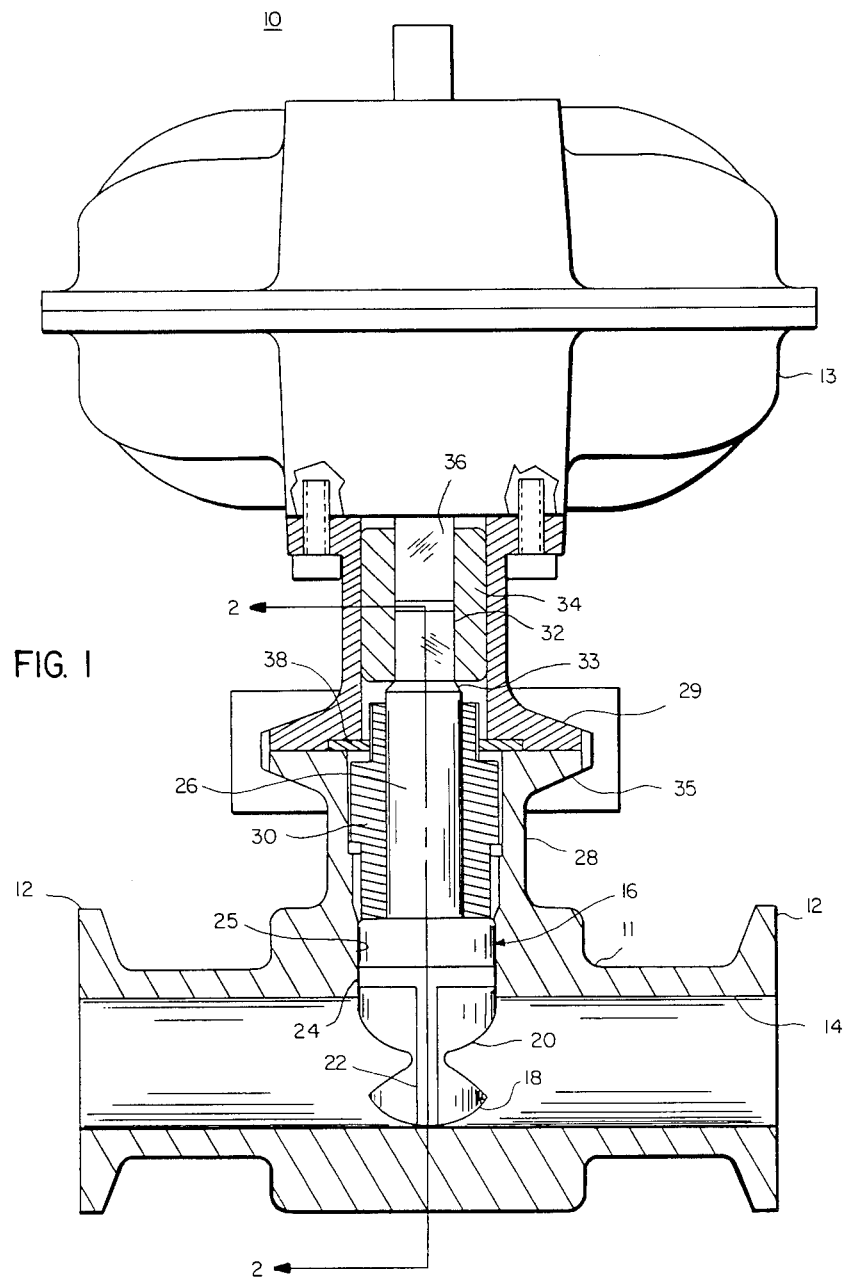
FIG. 1 is a partially sectioned view of a rotary sanitary valve constructed in accordance with the invention.
Figure 3:
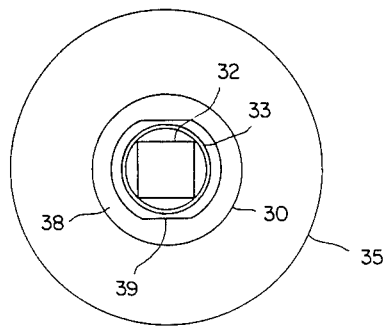
FIG. 3 is a plan view of the portion of the valve shown in FIG. 2.
Figure 2:
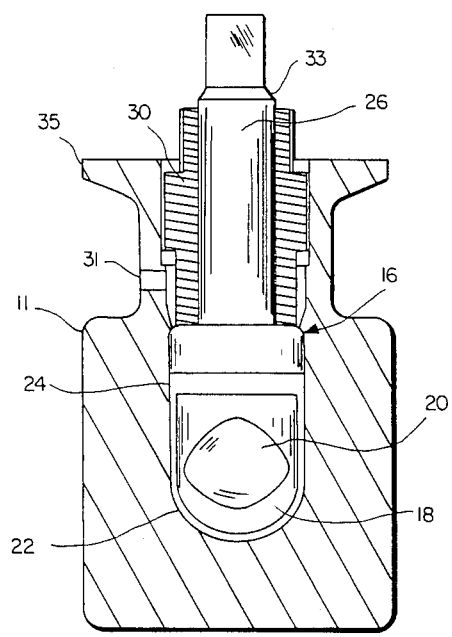
FIG. 2 is a cross section of the portion of the valve of FIG. 1 taken along line 2—2.

Throughout the description, like reference characters are used to indicate like elements and primed reference characters to illustrate parts that are similar, but not identical, to their unprimed counterparts. Referring to FIGS. 1–3, reference numeral 10 illustrates a rotary type sanitary valve of the invention. By rotary type is meant that valve 10 has a valve element that controls flow in the valve chamber as a function of its rotation. Valve 10 includes a valve body 11 that is fabricated as a unitary structure with an actuator mount 28 that intersects valve body 11 in a right angle. Actuator mount 28 is also sometimes referred to herein as supporting means for the valve element. A pair of flanges 12 are formed at opposite ends of valve body 11 for enabling connection of the valve into a pipeline (not shown) by any suitable, well-known means. A valve chamber 14 is formed in valve body 11 and comprises a highly finished, cylindrical passageway. Actuator mount 28 similarly defines a cylindrical cavity 25 that supports a valve element 16 for rotational movement. Valve element 16 is cylindrical and includes a hemispherical tip 18 and a pair of cutout portions 20 that permit a variable passageway to be formed in valve chamber 14 to permit flow therein to be controlled as a function of valve element rotation. Valve element 16 supports a U-shaped seal member 22 that extends over tip 18 and a circular seal member 24 that extends around the circumference of valve element 16. Seal member 22 forms a seal with the inner periphery of chamber 14 when valve element 16 is in its closed position. Circular seal member 24 is connected to, or integrally formed with, seal member 22 and forms a continuous seal with the surface of cylindrical cavity 25 of stem 28 for all conditions of valve operation. This is important to prevent the possibility of environmental contamination of valve chamber 14.

Valve element 16 is attached to, or integrally formed with, a cylindrical stem 26 that is formed into a drive end 32, of square cross section, with the transition between square drive end 32 and cylindrical stem 26 occurring at a beveled surface 33. An actuator drive 36, of mating square cross section, extends from actuator 13 and is coupled in driving engagement with the drive end 32 by means of a collar 34 that has a square hole, of appropriate dimension, formed therethrough.

A bearing 30 is suitably journaled to permit rotation of cylindrical stem 26 and may be secured in actuator mount 28 by any suitable means. Actuator mount 28 extends into a flange 35 which is designed to mate with a flange 29, coupled to actuator 13. An antirotation disk 38 is positioned between flanges 28 and 29 and includes a pair of flat sections 39 that engage with similarly shaped flattened areas on the outer surface of bearing 30 to prevent bearing 30 from rotating. It will be appreciated that the particular arrangement for preventing rotation of bearing 30 is a matter of choice and the invention is not to be limited to the construction shown. An inspection vent 31 is provided to permit verification of the integrity of the seal formed by seal member 24.

In operation, actuator 13 is energized by means (not shown) to move actuator drive 36 in a clockwise or counter clockwise direction which, by means of collar 34, imparts a similar rotation to valve element 16 by means of stem 26. With valve element 16 in its closed position, the seal member 22 prevents flow in valve chamber 14. In response to rotation of actuator drive 36, cutout portions 20 in valve member 16 form a passageway in valve chamber 14 for flow. Seal member 22 is disengaged from the inner periphery of valve chamber 14. It will be noted, however, that the seal formed by seal member 24 and the inner surface of cavity 25 in stem mount 28 is never broken. This is of critical importance to the suitability of the valve operation for this service application. As mentioned, it is important to preclude environmental contamination of the valve chamber and throughout valve operation seal member 24 maintains a continuous seal with actuator mount 28.

Figure 5:
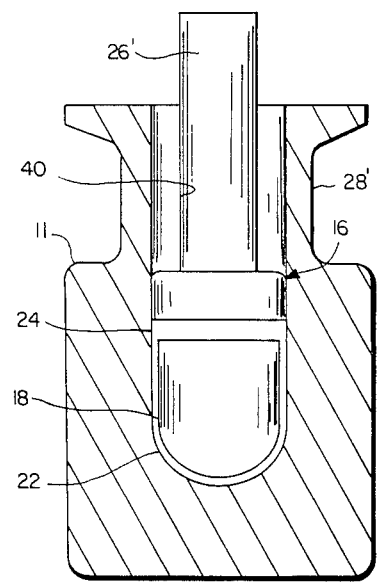
FIG. 5 is a section of FIG. 4 taken along the line 5—5.
Figure 4:
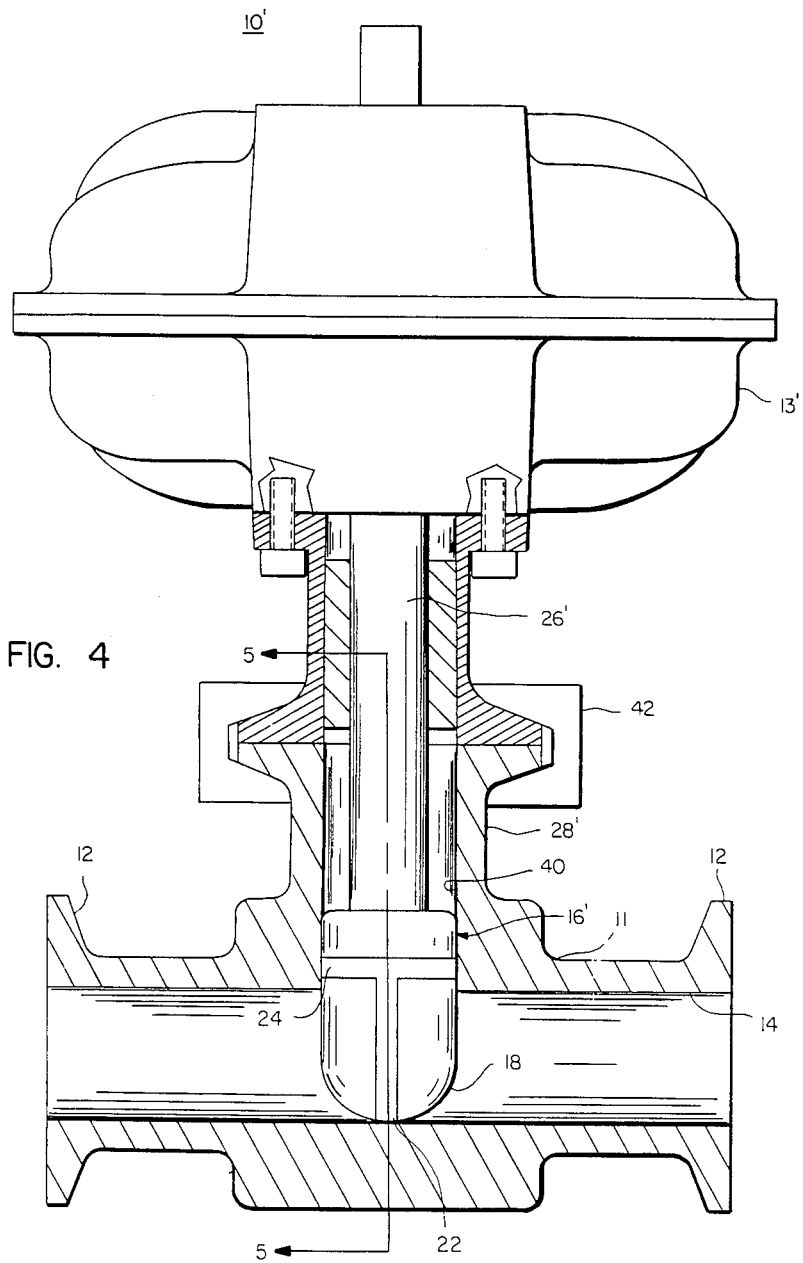
FIG. 4 is a partially sectioned view of a slidable sanitary valve constructed in accordance with another aspect of the invention.

Referring to FIGS. 4, 5 and 6, a sliding stem movement version of the valve is shown. Valve 10' includes a similar valve body 11' having flanges 12 and defining a cylindrical valve chamber 14 with an actuator mount 28' perpendicularly disposed to valve body 11'. Valve element 16' differs in that it does not include any cutout portions. Actuator mount 28' defines a polished inner cylindrical surface 40 within which valve element 16 is slidably movable. A stem 26' of generally cylindrical configuration extends into an actuator 13' which functions in response to means (not shown) to slide valve element 16' into and out of valve chamber 14 to control flow therein. As best illustrated in FIG. 6, when the valve is fully opened, valve element 16' is positioned high in actuator mount 28' and completely out of valve chamber 14. At no time does circular seal member 24 break its sealing contact with the polished cylindrical surface 40 in actuator mount 28'. Thus valve chamber 14 is never exposed to the outside environment.

In FIGS. 7 and 8, two different forms of construction of the valve element are shown. FIG. 7 shows an undercut or grooved configuration for valve element 16' with a horizontal circumferential groove 24' and a vertical U-shaped groove 22' formed therein. It will be appreciated that these grooves are configured such that appropriately shaped circular and U-shaped seal members 24 and 22 may be positioned and maintained therein. In practice, the seal material is molded in one piece and, due to its resilient nature, may be slightly distended and slipped into position in grooves 22' and 24'.

The configuration in FIG. 8 illustrates a valve element 16" that may be coated overall with a somewhat resilient material but have raised sections to form circumferential seal element 24" and U-shaped seal element 22'. It will be further appreciated that the valve element configuration of both FIGS. 7 and 8 may include the cutout portions 20 shown in FIGS. 1 and 2 and further that the valve elements 16, 16' and 16" may be molded out of any suitable material commensurate with the service application of the valve. Also, the seal members are preferably integrally formed.

During cleaning and sterilizing of pipelines, the straight-through cylindrical design of the valve chamber enables complete draining. As illustrated in FIG. 9, in the rotary version of the valve which has cutout portions for flow control, the valve element is mounted in a horizontal position such that the passageway 46 formed by the lower cutout portion 20 is positioned with a low point to permit complete draining of the valve chamber (and associated pipeline). In the sliding version of the valve, the entire valve chamber is readily opened to permit thorough cleaning by any suitable technique. The absence of threaded surfaces and the like in the valve chamber also materially assists resistance to build-up of deposits and contributes to thorough cleaning.

The integral stem and hemispherical plug design of the valve of the invention provide positive sealing and a readily cleanable design. The elastomeric bond has no crevices to trap the process or cleaning solution.

What has been described is a novel control valve suitable for sanitary installations where cleanliness and immunity from outside contaminants are extremely desirable. The valve is simple, readily cleanable, and economical to manufacture and operate. It is recognized that numerous modifications in the described embodiments of the invention will be apparent to those skilled in the art without departing from its true spirit and scope. The invention is to be limited only as defined in the claims.

We claim:

1. A sanitary valve comprising:
   a valve body defining a cylindrical valve chamber;
   a pair of flanges at each end of said valve chamber for coupling said valve body into a pipeline;
   a generally cylindrical valve element having a solid hemispherical tip and having resilient seal means at substantially right angles to each other;
   means supporting said valve element for movement to control flow in said valve chamber, said supporting means intersecting said valve chamber in a right angle and being in sealing engagement with one of said seal means;
   actuating means for effecting movement of said valve element; and
   said seal means in engagement with said supporting means maintaining sealing contact throughout all movement of said valve element.

2. The valve of claim 1 wherein said seal means comprises a circular seal about the circumference of said valve element in sealing engagement with said supporting means when said valve element is in either an open or a closed position and a U-shaped seal about the tip of said valve element, said U-shaped seal engaging the interior of said valve chamber when the valve element is in a closed position.

3. The valve of claim 2 wherein said valve element has a surface configuration for varying the area of a passageway in said valve chamber for flow control when said valve element is rotated and wherein said actuating means imparts rotational movement to said valve element.

4. The valve of claim 3 wherein said valve element includes seal retaining grooves and a generally elongate elastomer in said grooves forming said seal means.

5. The valve of claim 3 wherein said seal areas comprise raised strips of elastomeric material.

6. The valve of claim 2 wherein said valve element is movable into and out of said valve chamber to vary flow therein without interrupting the sealing engagement between said circular seal and the interior of said supporting means, and wherein said actuating means applies forces for moving said valve element into and out of said valve chamber.

7. The valve of claim 6 wherein said valve element includes seal retaining grooves and a generally elongate elastomer in said grooves forming said seal areas.

8. The valve of claim 7 wherein said seal areas comprise raised strips of elastomeric material.

9. A sanitary valve comprising:
a valve body defining a cylindrical valve chamber;
a pair of flanges at each end of said valve chamber for coupling said valve body into a pipeline;
a generally cylindrical valve element having a solid hemispherical tip;
a first seal encircling the body of said valve element;
a second seal extending around said hemispherical tip of said valve element and intersecting said first seal;
means supporting said valve element for rotary movement to control flow in said valve chamber, said supporting means intersecting said valve chamber in a right angle and forming a continuous seal with said first seal on said valve element throughout all movement of said valve element;
said valve element having a surface configuration for varying the area of a passageway in said valve chamber when said valve element is rotated; and
actuating means for effecting rotational movement of said valve element.

10. A sanitary valve comprising:
a valve body defining a cylindrical valve chamber;
a pair of flanges at each end of said valve chamber for coupling said valve body to a pipeline;
a generally cylindrical valve element having a hemispherical tip;
a first seal about the circumference of said valve element and a second U-shaped seal extending over said hemispherical tip and intersecting said first seal;
means supporting said valve element for longitudinal movement into and out of said valve chamber to control flow therethrough, said supporting means intersecting said valve chamber in a right angle and said first seal being in continuous sealing engagement therewith throughout all movement of said valve element; and
actuating means for effecting longitudinal movement of said valve element.

* * * * *